United States Patent Office 3,699,008
Patented Oct. 17, 1972

3,699,008
PROCESS FOR THE PURIFICATION OF CRUDE PHTHALIC ANHYDRIDE BY PLURAL STAGE VACUUM DISTILLATION WITH SIDE STREAM PRODUCT RECOVERY
Dieter Brendt and Gerd Helms, Junkersdorf, and Gerhard Keunecke, Geyen, Germany, assignors to Chemiebau Dr. A. Zieren G.m.b.H. & Co. KG, Cologne-Nuengersdorf, Germany
Filed June 18, 1969, Ser. No. 834,275
Claims priority, application Germany, July 3, 1968, P 17 68 817.4
Int. Cl. B01d 3/10; C07c 63/18
U.S. Cl. 203—72
14 Claims

ABSTRACT OF THE DISCLOSURE

A process for the purification of phthalic anhydride from a crude oxidation product of naphthalene or o-xylene wherein the purification can be carried out by continuously fractionally distilling the crude product in two columns. The pure phthalic anhydride is withdrawn in the vapor phase in the second column between the sump and the feed point of the distillate from the first column to the second column.

BACKGROUND OF THE INVENTION

The field of the invention is chemistry, heterocyclic carbon compounds, polycarboxylic acid anhydrides and particularly phthalic anhydride. The invention is particularly concerned with separatory distillation processes wherein plural distillations are performed on phthalic anhydride.

The physical and chemical properties of phthalic anhydride and the state of the prior art recovery and purification processes may be ascertained by reference to the Kirk-Othmer "Encyclopedia of Chemical Technology," 2nd ed., vol. 15 (1968), pp. 444–487 under the section entitled "phthalic Acid and Other Benzenepolycarboxylic Acids." The physical and chemical properties of phthalic anhydride are disclosed on pp. 444–446 of Kirk-Othmer, while the prior art manufacturing processes for phthalic anhydride are disclosed on pp. 448–452 and the methods of purification are particularly disclosed on pp. 451–452.

The crude phthalic anhydride of the present invention is produced by the catalytic oxidation of naphthalene or o-xylene with air in the gaseous phase. After the oxidation gases are cooled, a crude product is obtained which contains, in addition to about 92–95% by weight of phthalic anhydride, varying amounts of phthalic acid, maleic acid, maleic anhydride, phthalide, benzoic acid and also a number of higher boiling compounds and resins. Additionally, in the crude product prepared from naphthalene, there is approximately 0.3–0.6% by weight of napthoquinone.

In order to purify the phthalic anhydride, the crude product is subjected to a pretreatment. During this step, interfering impurities are converted into higher boiling resins, water is completely separated and readily boiling impurities are removed in part.

In the purification process according to German published application 1,227,443, the crude product is distilled up to the residue, the distillate is fractionated in order to separate forerunnings, and is then once again simply distilled for obtaining the pure product. According to this prior art process a final product of insufficient purity is obtained, since it is impossible to separate the residue sufficiently thoroughly by a simple distillation and consequently, parts thereof enter the pure product during the second simple distillation. The use of three reboiler stages associated with three stills, means a considerable expenditure in apparatus.

U.S. Pat. 3,380,896 of Scheiber et al. which issued Apr. 30, 1968 discloses the high purification of phthalic anhydride in a three stage reduced pressure distillation. According to the process of Scheiber et al. the starting materials are the oxidation products of naphthalene or o-xylene and these crude materials are heated to about 220–450° C., distilled under reduced pressure in a first column, the head product from the first column is distilled under reduced pressure in a second column and the sump product of the second column is distilled under reduced pressure in a third column.

It is known from German Pats. 1,097,427 and 1,167,810, to distill off from the crude phthalic anhydride a forerunning in a first fractionating column, and then to distill over the pure product in a second fractionating column. With this method of operation, the components of the residue travel successively through the evaporator cycles of both columns, and encrustations are formed on the heating surfaces in the course of time. These encrustations make it necessary to close the plant down from time to time in order to clean both evaporators, even though the vacuum distillation in both columns was intended to be a gentle treatment of the product.

SUMMARY OF THE INVENTION

Having in mind the limitations of the prior art, it is an object of the present invention to provide a purification process for crude phthalic anhydride wherein a pure phthalic anhydride is obtained with a low expenditure in cost for the evaporator and rectification apparatus. According to the present invention, the thermal load and the danger of decomposition connected with the distillation of the product are reduced by a multistage column.

The purification of the crude phthalic anhydride is started by distilling up to a residue and the thus obtained distillate is fractionally distilled for the purpose of separating forerunnings. According to the improvement of the present invention, the evaporated crude phthalic anhydried is conducted through a first short fractionating column and the pure phthalic anhydride is withdrawn in the vapor phase between the feed point of the distillate to a second column and the sump of the second column where the second column serves for separating the forerunnings. The phthalic anhydride, which is optionally pretreated thermally or chemically, is completely freed of the residue in the first short fractionating column.

In a preferred embodiment, the first short fractionating column has 3 to 7 theoretical plates.

BRIEF DESCRIPTION OF THE DRAWING

The process of the invention is illustrated in the accompanying drawings wherein—

Figure 1:
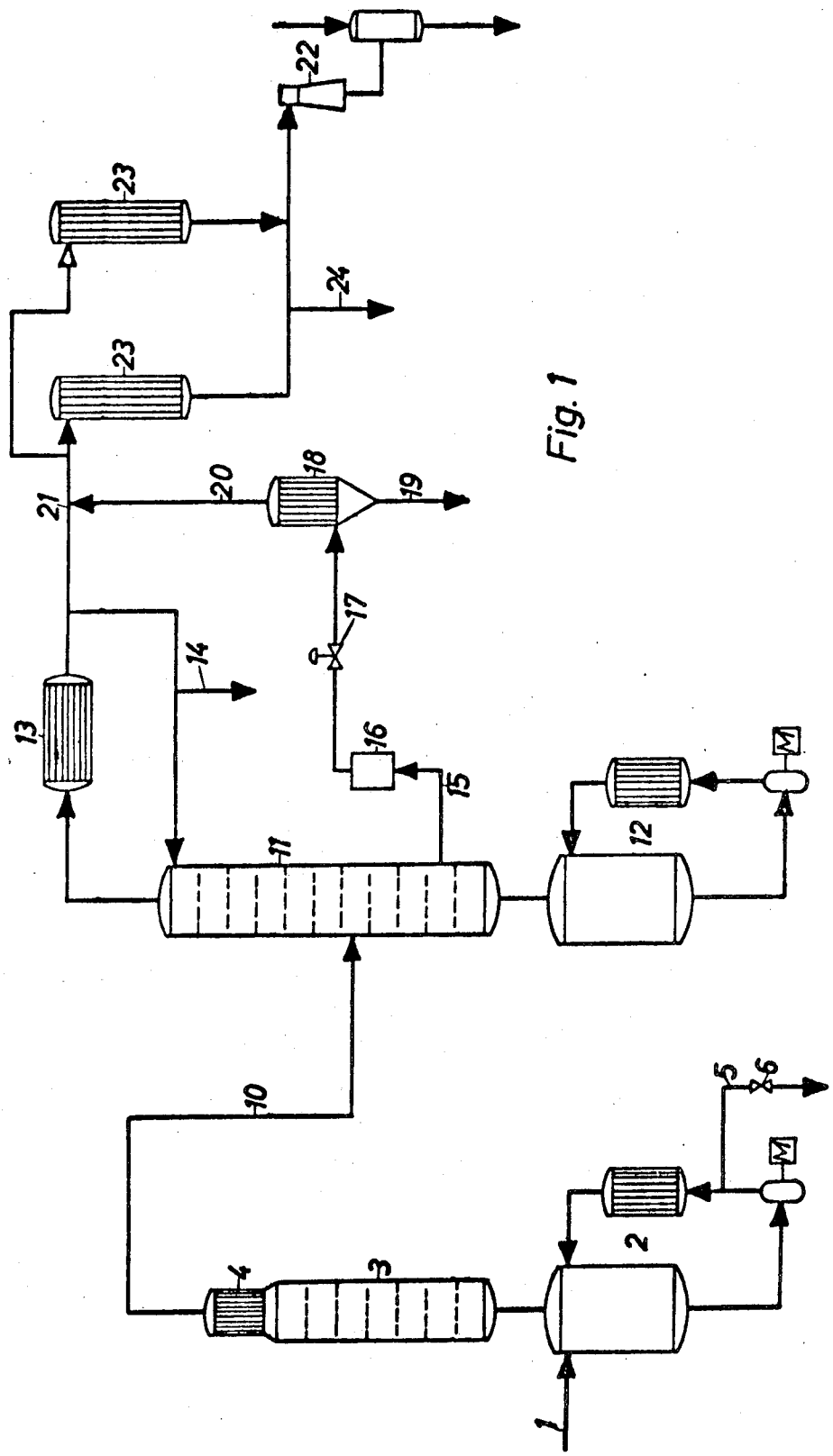
FIG. 1 is a schematic representation of a plant for conducting the process of the present invention.

In the plant of FIG. 1, the crude phthalic anhydride is fed through line 1 to the evaporator cycle 2 of a fractionating column 3 with a dephlegmator 4. The residue is withdrawn from the evaporator cycle 2 by way of the valve 6. The distillate of column 3 is charged, in the vapor phase, into approximately the midsection of the second fractionating unit consisting of column 11, evaporator cycle 12 and condenser 13. As the overhead of column 11, a fraction is distilled off which contains more volatile components and this is condensed in the condenser 13 and withdrawn from the plant via line 14. The pure phthalic anhydride is withdrawn via line 15 with the spray entrainment trap 16 by way of the control valve 17 from the vapor space above the first practical plate of column 11. Then this pure phthalic anhydride is liquefied in the condenser 18 and removed via line 19. The condensers 13, 18 are connected to an ejector 22 by way of lines 20, 21, which ejector removes by suction the components which could not be condensed in the condensers 13, 18. In the suction line 21, two sublimators 23 are additionally disposed. One of these is connected in the line 21 between the condensers 13, 18 and the ejector 22 and serves for separating the components which were not liquefied in the condensers 13, 18. The product deposited in the solid phase in the other sublimator is melted out and withdrawn via line 24.

Figure 2:
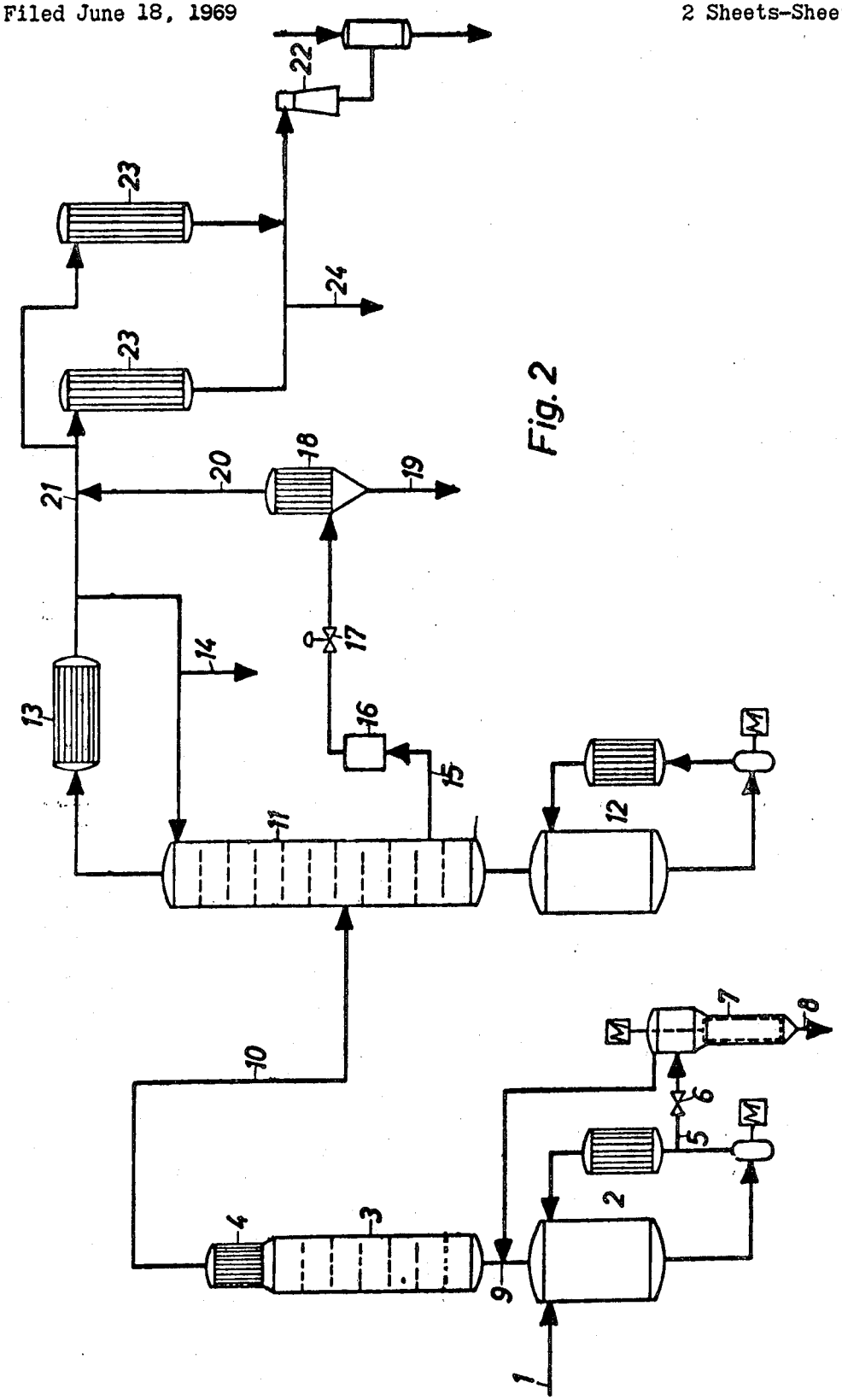
FIG. 2 is a schematic representation of the plant of FIG. 1, but wherein a two-stage evaporation is provided for the preliminary distillation.

In the plant according to FIG. 2, the crude phthalic anhydride is fed via line 1 to the first evaporator stage 2 of a fractionating column 3 with a dephlegmator 4. From the first evaporator stage 2, via line 5 and valve 6, residue is continuously withdrawn. This residue is further concentrated in the second evaporator stage 7 consisting of an evaporator with scored surfaces. Dry residue is continuously removed via line 8. The vapors from the first and second evaporator stages 2, 7 are combined in conduit 9 and enter the column 3. The dephlegmator 4 condenses only that portion of the vapors necessary for the reflux of column 3, whereas the main portion is conducted, via line 10, into the middle of column 11 with the evaporator unit 12. At the head of column 11, the more readily boiling components are withdrawn as forerunnings via cooler 13 and line 14. The pure phthalic anhydride is collected in the evaporator unit 12 and is removed in the gaseous phase via line 15, trap 16 and control valve 17 and is condensed in the cooler 18. This pure product is withdrawn in the liquid phase via conduit 19. The condensers 13 and 18 are connected to an ejector 22 which may be a vapor jet pump, and ejector diffusion pump or steam ejector, via the lines 20 and 21, which ejector removes by suction the non-condensible components. Two sublimators 23 are furthermore disposed in the suction line 21, one of which is connected in the line 21 between the condensers 13 and 18 and the ejector 22, for separating the components which were not liquefied in the condensers 13 and 18, while the product separated in the solid phase is melted out of the other sublimator and withdrawn through line 24.

By separating the residue in the evaporator cycle 2 or in the two-stage evaporator plant 2, 5–8, in accordance with the present invention, the plates of column 3 are not contaminated by resinous components. It is therefore possible to continuously distil crude phthalic anhydride having a high content of residue, such as the oxidation products of naphthalene.

DESCRIPTION OF THE PREFERRED EMBODIMENTS

According to one of the improvements of the present invention, the residue components are retained entirely in the sump of the first column. This is accomplished by the use of a short first fractionating column and in a preferred embodiment this column has about 3–7 theoretical plates.

As a result of the retention of the residue components in the first column, only phthalic anhydride and more readily boiling impurities enter the second fractionating column. As compared with the prior art distillation columns having a high number of plates, the short first fractionating column of the present invention is operated at a lower bubble temperature or under a lesser vacuum. The residue-free product of the first column is fed to the second column in the liquid or vapor phase and the forerunnings are distilled off at the head of the second column.

While the residue-free product does not form any residues on the evaporator heat exchange surfaces of the second column, two evaporators can be provided for the first column, so that, when one of them is inoperative due to encrustations, a second evaporator can be put into service. In another embodiment of the invention, the crude phthalic anhydride is evaporated in two stages wherein the product charged is first evaporated in a forced circulation evaporator device, a downdraft evaporator, or in an agitated vessel with wall or coil heating unit, to such an extent that there is not encrustation of the heat exchange surfaces and a flowable residue, still containing relatively large amounts of phthalic anhydride, is continuously withdrawn. This residue is then concentrated in an evaporator unit forming the second stage and having scored heat exchange surfaces to such a degree that the impurities are continuously discharged in the dry form. The vapors of the first and second evaporator stage enter the first column together. This mode of operation is especially suitable for processing a crude product obtained from naphthalene. The distillate of the first column is fed to the middle zone of the second column, and the pure product is withdrawn in the vapor phase from the lower section, preferably above the lowermost plate, of the second column.

The second column has a general range of about 20 to 30 theoretical plates and a preferred range of about 22 to 26 while the distillate of the first column is fed to the second column generally at about the 10 to 15 plate and preferably at the 12 to 14 plate. The pure product is withdrawn from the second column generally at about the 1 to 5 plate and preferably at about the 2 to 3 plate.

When the pure product is withdrawn from the lower section of the second column there are no impurities in the vapor phase which are readily volatile and entrained, less volatile impurities pass into the sump with the liquid phase and do not contaminate the product.

Preferably, the provision is made to withdraw about 0.2–5% by weight of the crude phthalic anhydride as the residue from the evaporator section of the first fractionating column. In case of an ordinary crude product it is thereby ensured that although all less volatile impurities remain as the residue, there is as little phthalic anhydride as possible left behind. It is therefore not necessary to withdraw residue from the sump of the second column, or it is done only at very long intervals. On the other hand, the proportion of phthalic anhydride in the residue, and the resultant loss, are very low. It is especially provided that the first fractionating column is operated at a reflux ratio of between 0.1 and 5.

By setting the reflux ratio within these limits, depending on the amount and type of the impurities in the crude product, a practically complete separation of the components of poor volatility from the phthalic anhydride is obtained.

Suitably, at the head of the first column, only that portion of the vapors is condensed which is required for the reflux, and the remaining proportion is charged in the vapor phase into the second column, particularly to the middle section of the second column. This embodiment exhibits the advantage that a collecting tank and a pump in the product line between the columns are saved, and the evaporator of the second fractionating column is of a smaller size.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

To the flask of a first laboratory column having 6 theoretical plates, 1,000 parts by weight per hour of unpretreated crude phthalic anhydride produced by the oxidation of o-xylene is fed in the liquid phase. The crude product has the following composition:

| | Percent by wt. |
|---|---|
| Phthalic anhydride | 94.3 |
| Phthalic acid | 4.5 |
| Maleic acid anhydride | 0.4 |
| Benzoic acid | 0.2 |
| Phthalide | 0.1 |
| o-Toluic acid | 0.1 |
| Unknown components having a higher boiling point than phthalic anhydride, and residue | 0.18 |
| More readily boiling unknown components | 0.2 |

The crude product contained 0.13% by weight of water-insoluble residue. At a pressure of 300 mm. Hg, a head temperature of 243° C., and a bubble temperature of 250–255° C., 988 parts by weight per hour of liquid condensate was withdrawn at the head of the first column with a reflux ratio of 0.5. From the sump of the column, 3 parts by weight per hour of residue was removed. The condensate removed at the head of the first column had the following composition:

| | Percent by wt. |
|---|---|
| Phthalic anhydride | 99.31 |
| Maleic acid anhydride | 0.20 |
| Benzoic acid | 0.18 |
| Phthalide | 0.08 |
| o-Toluic acid | 0.10 |
| Unknown components having a lower boiling point than phthalic anhydride | 0.10 |

The water-insoluble residue of the condensate was less than 0.01% by weight. Higher boiling unknown components could not be detected by gas chromatography.

The 988 parts by weight of condensate from the first column were fed hourly to a second laboratory column having 20 theoretical plates, at about the level of the tenth theoretical plate. Under a vacuum of about 60 mm. Hg, there was withdrawn hourly at the head of the second column 14.8 parts by weight as forerunnings. At the lower end of the second column, 972 parts by weight per hour of pure phthalic anhydride were withdrawn in the vapor phase. This pure product exhibited a cold-Hazen color value of 15 and a heat-Hazen color value of 50.

EXAMPLE 2

For purposes of comparison, the process was conducted under the same conditions as set forth in the aforementioned example, but the crude product was simply distilled, without any column. Per hour, 994 parts by weight of a condensate was obtained having the following composition:

| | Percent by wt. |
|---|---|
| Phthalic anhydride | 99.2 |
| Maleic acid anhydride | 0.2 |
| Benzoic acid | 0.18 |
| Phthalide | 0.10 |
| Toluic acid | 0.10 |
| Unknown components boiling higher than phthalic anhydride and residue | 0.10 |
| More readily boiling unknown components | 0.10 |

The condensation product was distilled as described in Example 1 in a second laboratory column, with 15 parts by weight being withdrawn hourly at the head of the column, but wherein the pure product was not withdrawn from the vapor space of the second column, but from the sump, and was once again subjected to a simple distillation. The thus obtained pure phthalic anhydride exhibited a cold-Hazen color number of 30 and a heat-Hazen color number of 100.

The preferred conditions maintained in the first evaporator cycle, the second evaporator cycle, the first column and the second column according to the invention employing a typical oxidation product of o-xylene or naphthalene are as follows:

| | Evaporator cycle | | Column | |
|---|---|---|---|---|
| | First | Second | First | Second |
| With oxidation product of o-xylene: | | | | |
| Temperature (° C.) | 250–275 | 220–238 | 235–265 | 170–205 |
| Pressure (mm. Hg absolute) | 300–550 | 160–260 | 250–500 | 50–150 |
| Plates | | | 3–7 | 20–30 |
| Feed entry (plate) | | | (¹) | 10–15 |
| Product exit (plate) | | | (²) | 1–5 |
| Reflux ratio | | | 0.1–5 | 40–100 |
| With oxidation product of naphthalene: | | | | |
| Temperature (° C.) | 250–275 | 210–232 | 235–265 | 170–205 |
| Pressure (mm. Hg absolute) | 300–550 | 300–550 | 250–500 | 50–160 |
| Plates | | | 3–7 | 15–25 |
| Feed entry (plates) | | | (¹) | 10–15 |
| Product exit (plate) | | | (²) | 1–5 |
| Reflux ratio | | | 0.1–5 | 20–50 |

¹ Bottom.
² Top.

We claim:
1. A process for the continuous fractional distillation of a crude phthalic anhydride derived from the oxidation of an organic compound selected from the group consisting of o-xylene and naphthalene, the steps comprising in combination:
  (a) distilling the crude phthalic anhydride in a first fractionating column having about 3–7 theoretical plates and operating under a pressure of 250–500 mm. Hg absolute;
  (b) withdrawing as head product from the first fractionating column vapor phase phthalic anhydride and low boiling forerunnings, and as bottom product a residue amounting to about 0.2–5% by weight of said crude phthalic anhydride;
  (c) feeding said head product into about the middle of a second fractionating column having about 15–30 theoretical plates and operating under a pressure of 50–150 mm. Hg absolute;
  (d) withdrawing from the head of the second column a stream comprising the low boiling forerunnings; and
  (e) withdrawing from said second column at a point intermediate the sump and the feed point, a vapor phase stream of pure phthalic anhydride.

2. The process of claim 1 wherein the first fractionating column is operated with a reflux ratio of between about 0.1 and 5.

3. The process of claim 2 wherein a portion of the vapors necessary for the reflux is condensed at the head of the first column and the remaining portion is fed in the vapor phase to the second column.

4. The process of claim 1 wherein said vapor phase intermediate product is withdrawn above the lowermost plate of the second column.

5. The process of claim 1 further comprising the preceding steps of evaporating the crude phthalic anhydride in two cycles before fractionation in the first column, the second cycle being conducted in an evaporator having a scored surface and the evaporation residue being removed as a solid phase.

6. A process as defined by claim 1 wherein said crude phthalic anhydride is derived from o-xylene, the second column has 20–30 theoretical plates, and the reflux ratio in the second column is 40–100.

7. A process as defined by claim 1, wherein said crude phthalic anhydride is derived from naphthalene, the second column has 15–25 theoretical plates and the reflux ratio is 20–50.

8. A process as defined by claim 1 wherein the pure product is withdrawn from the vapor space above the 1st to 5th plate inclusive of the second column.

9. A process as defined by claim 1 wherein the pure product is withdrawn from the vapor space above the 2nd or 3rd plate of the second column.

10. A process as defined by claim 1 wherein the head product from the first column is fed into the second column at about between the 10th and 15th plate inclusive.

11. A process as defined by claim 1, said second column having 22–26 theoretical plates, the feed to the second column being at about between the 12th and 14th plate inclusive.

12. A process as defined by claim 9, said second column having 22–26 theoretical plates, the feed to the second column being at about between the 12th and 14th plate inclusive.

13. A process as defined by claim 1, said first column operating at 235–265° C. and said second column operating at 170–205° C.

14. A process as defined by claim 1 wherein the crude phthalic anhydride is fed to the bottom of the first distillation column.

References Cited

UNITED STATES PATENTS

| | | | |
|---|---|---|---|
| 1,106,832 | 8/1914 | Obrador | 202—155 |
| 2,640,017 | 5/1953 | Graff | 203—99 |
| 2,670,325 | 2/1954 | West et al. | 260—346.7 |
| 2,672,434 | 3/1954 | MacFarlane | 203—82 |
| 2,786,805 | 3/1957 | Sullivan et al. | 260—346.7 |
| 3,011,955 | 12/1961 | Brown | 203—88 |
| 3,187,016 | 6/1965 | Brown et al. | 260—346.7 |
| 3,380,896 | 4/1968 | Scheiber et al. | 203—88 |
| 3,408,265 | 10/1968 | Ward | 203—99 |
| 3,530,043 | 9/1970 | Horn et al. | 202—155 |

WILBUR L. BASCOMB, JR., Primary Examiner

U.S. Cl. X.R.

203—77, DIG 19; 202—155, 198; 260 346.7

UNITED STATES PATENT OFFICE
CERTIFICATE OF CORRECTION

Patent No. 3,699,008          Dated  October 17, 1972

Inventor(s) DIETER BRENDT ET AL.

It is certified that error appears in the above-identified patent and that said Letters Patent are hereby corrected as shown below:

COLUMN 6, line 22, in the Table, under the title "With oxidation product of naphthalene: . . . Pressure . . . ", the numerals under the column "Evaporator cycle - Second", "300-550" should read -- 130-230 --; and on the same line, under the column "Column - Second", "50-160" should read -- 50-150 --.

Signed and sealed this 3rd day of July 1973.

(SEAL)
Attest:

EDWARD M. FLETCHER, JR.          Rene Tegtmeyer
Attesting Officer                Acting Commissioner of Patents